March 23, 1954 P. BAKKER 2,673,245

AUTOMATIC SWITCH FOR TELEPHONE SYSTEMS

Filed Aug. 25, 1950

2 Sheets-Sheet 1

INVENTOR.
Pier Bakker

BY

Smith, Olsen & Baird

Attys.

March 23, 1954 P. BAKKER 2,673,245

AUTOMATIC SWITCH FOR TELEPHONE SYSTEMS

Filed Aug. 25, 1950 2 Sheets-Sheet 2

INVENTOR.
Pier Bakker

BY Smith, Olsen & Baird

Attys.

Patented Mar. 23, 1954

2,673,245

UNITED STATES PATENT OFFICE 2,673,245

AUTOMATIC SWITCH FOR TELEPHONE SYSTEMS

Pier Bakker, Chicago, Ill., assignor to Automatic Electric Laboratories, Inc., Chicago, Ill., a corporation of Delaware Application August 25, 1950, Serial No. 181,510

15 Claims. (Cl. 179—18)

The present invention relates to telephone systems, and more particularly to automatic switches for use in toll switching telephone systems.

It is a general object of the present invention to provide in a toll switching telephone system an improved and simplified automatic switch.

Another object of the invention is to provide a combination one-digit and two-digit automatic switch that includes a pair of wiper sets and embodies an improved and simplified wiper switching arrangement.

Another object of the invention is to provide a selector switch that embodies an improved impulsing and supervisory relay network.

A further object of the invention is to provide a combination selector switch and repeater of the improved character noted.

Further features of the invention pertain to the particular arrangement of the circuit elements of the automatic switches, whereby the above-outlined and additional operating features thereof are attained.

Figure 1:
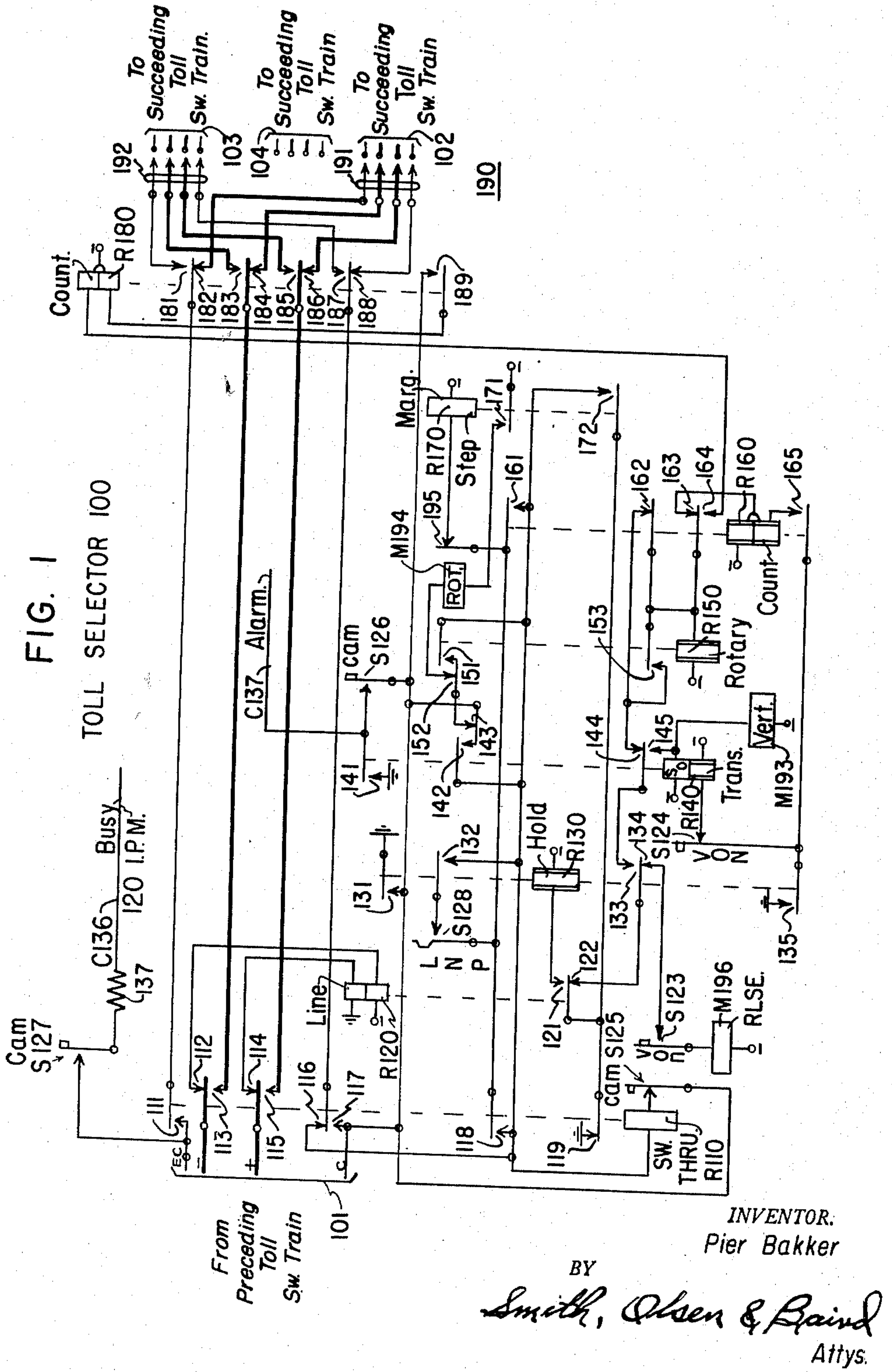
Figure 2:
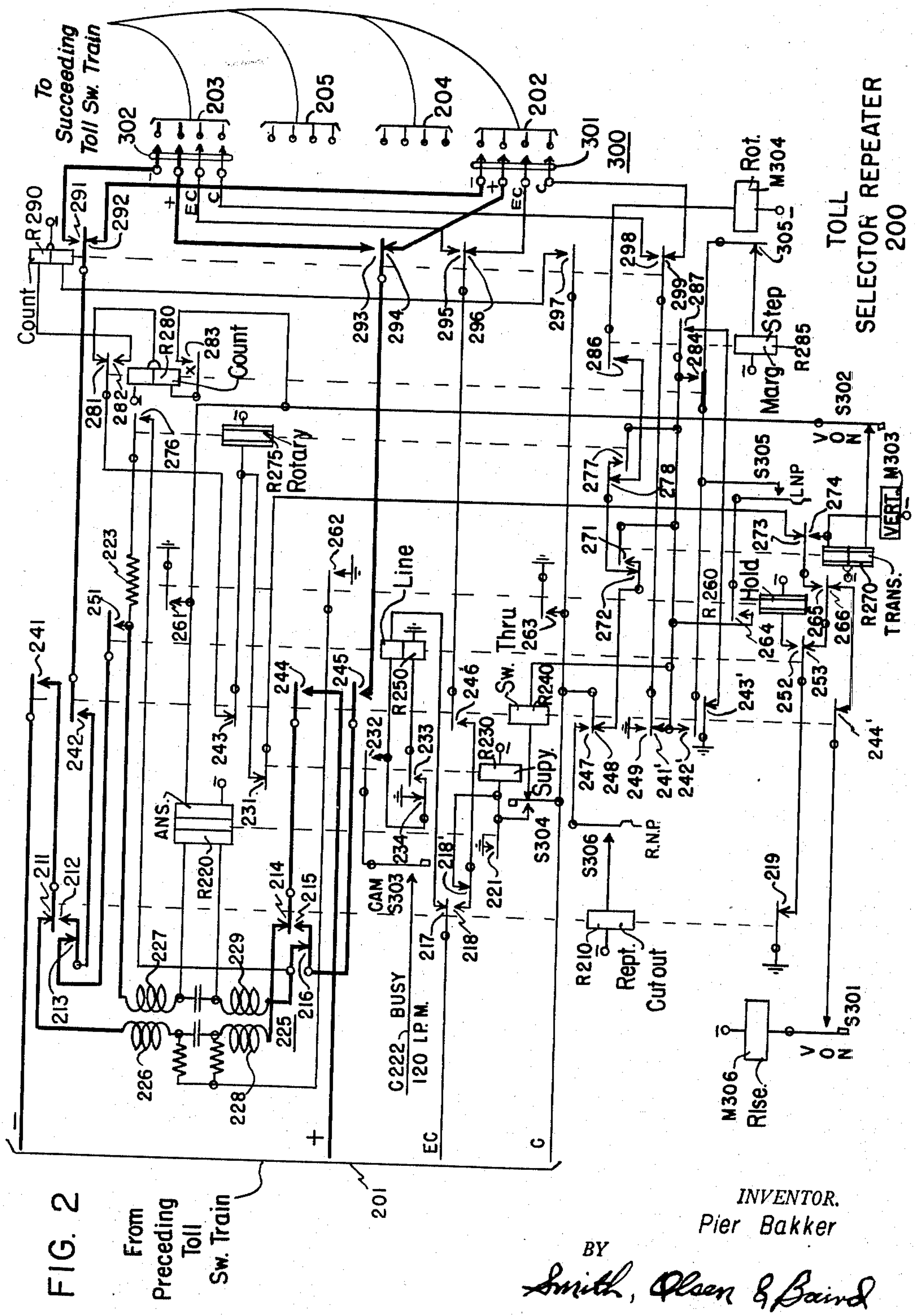

The invention, both as to its organization and method of operation, together with further objects and advantages thereof, will best be understood by reference to the following specification taken in connection with the accompanying drawings, in which Figure 1 is a circuit diagram of a combination one-digit and two-digit selector switch emodying the present invention; and Fig. 2 is a circuit diagram of a combination one-digit and two-digit selector switch-repeater embodying the present invention.

Referring now more particularly to Fig. 1, the toll selector 100 there illustrated, and embodying the features of the present invention, is of the combination one-digit and two-digit type. The selector 100 comprises a Strowger mechanism 190 including a lower wiper set 191 and an upper wiper set 192, as well as lower and upper contact banks respectively accessible to the two wiper sets noted; each of the contact banks comprises a plurality and maximum of ten vertically spaced-apart levels or rows of individual contact sets disposed in spaced relation in the rotary direction; and certain of the levels of contact sets in the respective lower and upper contact banks are paired so that the respective lower and upper wiper sets 191 and 192 have simultaneous access thereto.

Further, the toll selector 100 occupies an intermediate position in a toll switch train, and further includes an incoming trunk 101 that is accessible to preceding toll switching apparatus, not shown, that is, in turn, accessible to a toll operator switchboard, not shown. Also the contact sets provided in the various levels of the lower and upper contact banks terminate groups of trunks extending to succeeding toll switching apparatus, not shown. The portions of the toll switch train preceding and succeeding the toll selector 100 have not been illustrated in the interest of brevity.

Specifically, in the contact banks of the Strowger mechanism 190, the lower wiper set 191 has access to a level of contact sets terminating a group of outgoing trunks 102, etc., and the upper wiper set 192 has access to a level of contact sets terminating a group of outgoing trunks 103, etc., these levels in the respective lower and upper contact banks being paired with respect to each other so that the respective lower and upper wiper sets 191 and 192 have simultaneously access to the outgoing trunks 102 and 103. Also the lower contact bank of the Strowger mechanism 190 comprises a level of contact sets terminating a group of outgoing trunks 104, etc., accessible to the lower wiper set 191. In the toll selector 100, the incoming trunk 101 comprises a pair of line conductors, a hold conductor, and a control conductor respectively marked +, —, C and EC. Also each of the outgoing trunks 102, etc., comprises a pair of line conductors, a hold conductor and a control conductor.

Further the Strowger mechanism 190 comprises a vertical magnet M193 for driving the wiper carriage, mounting the lower and upper wiper sets 191 and 192, step-by-step in the vertical direction away from its normal vertical position, a rotary magnet M194 for driving the wiper carriage step-by-step in the rotary direction away from its normal rotary position, and a release magnet M196 for releasing the wiper carriage and for causing it to be returned to its normal rotary and vertical positions. Also associated with the wiper carriage of the Strowger mechanism 190 are two sets of switch springs S123 and S124 that are operated when the wiper carriage is moved one step in the vertical direction away from its normal vertical position, and three sets of switch springs S125, S126 and S127 that are operated when the wiper carriage is moved eleven steps in the rotary direction away from its normal rotary position. Finally a set of switch springs S128 is associated with the wiper carriage of the Strowger mechanism 190 that is operated when the wiper carriage is moved in the vertical direction a predetermined number of steps corresponding to the level of the group of trunks 104, etc., appearing before the lower wiper set 191.

Finally the toll selector 100 comprises a relay group including a switch through relay R110, a line relay R120, a hold relay R130, a transfer relay R140, a rotary relay R150, a count relay R160, a step relay R170, and a count or wiper switching relay R180.

First assuming that a connection is to be extended via the toll switch train by way of the toll selector 100 and by way of one of the outgoing trunks in the group including the outgoing trunk 102, the toll selector 100 is marked as idle to the preceding toll switch train by the absence of potential upon the hold conductor of the incoming trunk 101 extending thereto. When the preceding toll switch train seizes the toll selector 100 via the incoming trunk 101, ground potential is applied to the hold conductor of the incoming trunk 101 and a loop circuit is completed between the line conductors of the incoming trunk 101 so as to energize in series the upper and lower windings of the line relay R120 in order to cause the latter relay to operate. This loop circuit also includes the contacts 112 and 114. Upon operating, the line relay R120 completes, at the contacts 121, a circuit, including the contacts 119, for operating the hold relay R130. Upon operating, the hold relay R130 completes, at the contacts 131, a path for applying ground potential to the hold conductor of the incoming trunk 101 in order further to hold the preceding toll switch train and to mark as busy thereto the incoming trunk 101. Also the hold relay R130 completes, at the contacts 135, a circuit, including the set of switch springs S124, for energizing the lower winding of the transfer relay R140 in order to cause the latter relay to operate.

At this time, the first digit is received over the line conductors of the incoming trunk 101 in order to cause the line relay R120 to follow; and it may be assumed that this first digit is the digit 1. Accordingly, the line relay R120 restores and then reoperates, interrupting and then recompleting, at the contacts 121, the circuit for energizing the winding of the hold relay R130 in order to cause the latter relay to remain operated during impulsing as it is of the slow-to-release type. Also the line relay R120 completes and then interrupts, at the contacts 122, a circuit, including the contacts 119, 133 and 145, for energizing the upper winding of the transfer relay R140 in multiple with the vertical magnet M193 so as to retain the transfer relay R140 in its operated position during impulsing as it is of the slow-to-release type and to effect operation and restoration of the vertical magnet M193 so that the wiper carriage of the Strowger mechanism 190 is driven one step in the vertical direction away from its normal vertical position. When the wiper carriage of the Strowger mechanism 190 is thus driven one step away from its normal vertical position, the sets of switch springs S123 and S124 are operated. Specifically, the set of switch springs S123 is closed to prepare a circuit traced hereinafter for operating the release magnet M196 of the Strowger mechanism 190; and the set of switch springs S124 is opened to interrupt the previously-traced circuit for energizing the lower winding of the transfer relay R140. Also when the wiper carriage of the Strowger mechanism 190 is driven one step in the vertical direction away from its normal vertical position, the lower and upper wiper sets 191 and 192 are moved together so that they respectively select the two groups of outgoing trunks respectively including the outgoing trunks 102 and 103. In passing, it is noted that the count relay R180 normally occupies its restored position so that the lower wiper set 191 is normally effectively selected, at the contacts 182, 184, 186 and 188.

At the conclusion of the first digit 1, the line relay R120 is retained in its operated position in order to retain operated the hold relay R130 so that the transfer relay R140 restores shortly thereafter, the latter relay being of the slow-to-release type. Upon restoring, the transfer relay R140 interrupts, at the contacts 145, a further point in the circuit for operating the vertical magnet M193, and prepares, at the contacts 144, a point in a circuit traced hereinafter for energizing the winding of the rotary relay R150.

When the second digit is received, the line relay R120 again follows; and in the present instance, the second digit is the digit 1. Accordingly, the line relay R120 restores and then reoperates retaining operated the hold relay R130 during impulsing as it is of the slow-to-release type. Also the line relay R120 upon restoring completes, at the contacts 122, the previously-mentioned circuit, including the contacts 119, 133, 144 and 162 for energizing the winding of the rotary relay R150, as well as a multiple circuit, including the contacts 163, for energizing the upper winding of the count relay R160. The rotary relay R150 operates to complete, at the contacts 153, an alternative path in the circuit for energizing the winding thereof; while the count relay R160 operates only through its first step; this relay being of the two-step type. Upon operating through its first step, the count relay R160 closes only the contacts 165, completing a path, including the contacts 135, for short-circuiting the lower winding thereof. The path for short-circuiting the lower winding of the count relay R160 also includes the contacts 163, 153, 144, 133, 122 and 119. When the line relay R120 then reoperates at the conclusion of the second digit 1, it interrupts, at the contacts 122, the previously-traced circuit for energizing the winding of the rotary relay R150 and the previously-traced multiple path for short-circuiting the lower winding of the count relay R160. When the path mentioned for short-circuiting the lower winding of the count relay R160 is thus interrupted, there is completed a circuit, including the contacts 165 and 135, for energizing in series the lower and upper windings of the count relay R160; whereby the latter relay operates through its second step, it being of the two-step type as previously noted. When the count relay R160 operates through its second step, it interrupts, at the contacts 163, a further point in the previously-traced circuit for energizing the upper winding thereof; and prepares, at the contacts 164, a point in a circuit that is not employed in the present instance, but that is used in an operation subsequently described for energizing the upper winding of the count relay R180. Also the count relay R160 completes, at the contacts 161, a circuit, including the contacts 195, 151, 143 and 131, for operating the step relay R170. Upon operating the step relay R170 completes, at the contacts 172, a holding circuit, including the contacts 119, 161 and 195, for energizing the winding thereof; and prepares, at the contacts 171, a circuit traced hereinafter for operating the rotary magnet M194 of the Strowger mechanism 190.

At the conclusion of the second digit 1, the line relay R120 is retained in its operated position retaining operated the hold relay R130 so that the rotary relay R150 restores shortly thereafter, it being of the slow-to-release type. Upon restoring, the rotary relay R150 completes, at the contacts 152, the previously-mentioned circuit, including the contacts 171, 143 and 131, for operating the rotary magnet M194; whereby the wiper carriage of the Strowger mechanism 190 is driven away from its normal rotary position one step in the rotary direction so that the lower wiper set 191 and the upper wiper set 192 are moved together and respectively select the first outgoing trunks in the groups respectively including the outgoing trunks 102 and 103. However, in the present example, only the outgoing trunk in the group selected by the lower wiper set 191 is tested by the switch through relay R110 by virtue of the circumstance that the lower wiper set 191 is selected by the restored position of the count relay R180. Also upon operating, the rotary magnet M194 interrupts, at the contacts 195, the holding circuit for retaining operated the step relay R170. Upon restoring, the step relay R170 interrupts, at the contacts 172, a further point in the holding circuit for energizing the winding thereof; and interrupts, at the contacts 171, the circuit for operating the rotary magnet M194 so that the rotary magnet M194 is restored.

More particularly, at this time ground potential, at the contacts 131, is applied via the set of switch springs S125, the winding of the switch through relay R110 and the contacts 116 and 188 to the hold wiper of the lower wiper set 191, whereby the switch through relay R110 performs the busy test noted. Specifically in the event the first outgoing trunk in the group including the outgoing trunk 102 is busy at this time, ground potential appears on the hold conductor thereof, whereby a path substantially identical to that traced above is completed for short-circuiting the winding of the switch through relay R110 so as to prevent operation of the latter relay. Also in this event, the application of ground potential upon the hold conductor of the first outgoing trunk mentioned completes a circuit, including the hold wiper of the lower wiper set 191, the contacts 188, 116, 161 and 195, for reoperating the step relay R170. Upon reoperating, the step relay R170 again completes, at the contacts 172, the holding circuit for energizing the winding thereof; and again completes, at the contacts 171, the circuit for operating the rotary magnet M194. Accordingly, it will be understood that the step relay R170 and the rotary magnet M194 interact to effect successive stepping of the wiper carriage of the Strowger mechanism 190 so long as busy outgoing trunks in the group, including the outgoing trunk 102, are encountered by the hold wiper of the lower wiper set 191.

When, however, an idle outgoing trunk in the group, including the outgoing trunk 102, in selected by the lower wiper set 191, further operation of the Strowger mechanism 190 in the rotary direction is arrested by virtue of the absence of potential upon the hold conductor of the outgoing trunk noted. Specifically, in this case, absence of ground potential upon the hold conductor of the outgoing trunk noted prevents completion of the path for short-circuiting the winding of the switch through relay R110; and prevents completion of the direct circuit for energizing the winding of the step relay R170. More specifically, in this case, a circuit, including the contacts 131, the set of switch springs S125, and the contacts 161 and 195, is completed for energizing in series the winding of the switch through relay R110 and the winding of the step relay R170. When this series circuit is thus completed, the switch through relay R110 operates; however, the step relay R170 does not operate as the latter relay is of the marginal type. Upon operating, the switch through relay R110 completes, at the contacts 118, a holding circuit, including the contacts 195, the set of switch springs S125 and the contacts 131 for energizing the winding thereof in series with the winding of the step relay R170. Further the switch through relay R110 interrupts, at the contacts 116, a further point in the above-traced testing circuit extending to the hold wiper of the lower wiper set 191; and completes, at the contacts 117, a direct path, including the contacts 131 and 188, for applying ground potential to the hold wiper of the lower wiper set and consequently to the hold conductor of the selected outgoing trunk in the group, including the outgoing trunk 102. Further, the switch through relay R110 completes, at the contacts 111, 113, 115 and 117 connections respectively including the contacts 182, 184, 186 and 188 between the conductors of the incoming trunk 101 and the corresponding wipers of the lower wiper set 191; and thus to the corresponding conductors of the selected outgoing trunk. Also the switch through relay R110 interrupts, at the contacts 112 and 114, the loop circuits for energizing in series the upper and lower windings of the line relay R120 in order to cause the latter relay to restore. Finally the switch through relay R110 interrupts, at the contacts 119, the circuit for retaining energized the winding of the hold relay R130 in order to cause the latter relay to restore shortly thereafter, it being of the slow-to-release type. Upon restoring, the hold relay R130 interrupts, at the contacts 135, the holding circuit for retaining energized the lower winding of the count relay R160 in order to cause the latter relay to restore shortly thereafter, it being of the slow-to-release type. Further the hold relay R130 interrupts, at the contacts 131, the path for applying ground potential in the toll selector 100 to the hold conductor of the incoming trunk 101 and to hold the wiper of the lower wiper set 191. However, at this time, the preceding switch train retains ground potential upon the hold conductor of the incoming trunk 101, whereby this ground potential is applied to the hold wiper of the lower wiper set 191 and the switch through relay R110 in the toll selector 100 is retained in its operated position. At this time, the toll selector 100 has operated to select an idle outgoing trunk in the group, including the outgoing trunk 102, and has operated to complete a connection between the incoming trunk 101 and the selected outgoing trunk in the group noted. For reference purposes, it may be assumed that the toll selector 100 has operated to select the particular outgoing trunk 102 and has completed a connection between the incoming trunk 101 and the outgoing trunk 102, whereby the toll selector 100 is retained in its operated position by virtue of the application of ground potential upon the hold conductor of the incoming trunk 101 in the preceding toll switch train.

At this time, one or more digits that may be received over the line conductors of the incoming trunk 101 proceed directly over the line wipers of the lower wiper set 191 and consequently over the line conductors of the outgoing trunk 102 to the succeeding toll switch train. Moreover any supervisory controls may be transmitted directly between the line and control conductors of the incoming trunk 101 and the corresponding line and control conductors of the outgoing trunk 102 by virtue of the circumstance that the toll selector 100 occupies its switched-through position. For example, answer and disconnect signals may be returned over the line conductors or the control conductors of the outgoing trunk 102 and consequently over the line conductors or the control conductor of the incoming trunk 101 and the preceding toll switch train to the toll switchboard, not shown. Moreover should the succeeding toll switch train encounter an "all-trunks-busy" condition, 120 ground impulses per minute are applied to the control conductor of the outgoing trunk 102 and are returned over the connection via the control conductor of the incoming trunk 101 so as to effect the return of an "all-trunks-busy" signal to the toll switchboard, not shown.

At the conclusion of the established connection, in response to a release that is performed over the preceding toll switch train, ground potential is removed from the hold conductor of the incoming trunk 101, interrupting the holding circuit for energizing in series the winding of the switch through relay R110 and the winding of the step relay R170 so as to cause the switch through relay R110 to restore. Upon restoring, the switch through relay R110 completes, at the contacts 119, a circuit, including the contacts 122 and 134 and the set of switch springs 123, for operating the release magnet M196, whereby the wiper carriage of the Strowger mechanism 190 is released and returned to its normal rotary and vertical positions. When the wiper carriage of the Strowger mechanism 190 is thus released, the sets of switch springs S123 and S124 are again operated. Specifically, the set of switch springs S123 is operated to interrupt the circuit for retaining operated the release magnet M196. Further the switch through relay R110 interrupts, at the contacts 117, the connection between the hold wiper of the lower wiper set 191 and the hold conductor of the incoming trunk 101 so as to effect the release of the succeeding toll switch train. At this time, the toll selector 100 is completely released and available for further use.

Now assuming that a connection is to be extended via the toll switch train, by way of the toll selector 100 and by way of one of the outgoing trunks in the group, including the outgoing trunk 103, the toll selector 100 is marked as idle to the preceding toll switch train by the absence of potential upon the hold conductor of the incoming trunk 101 and is seized in the manner previously explained effecting operation of the line relay R120, the hold relay R130 and the transfer relay R140. In this case, the toll selector 100 receives the first digit 1 and the second digit 2, based upon the prior assumption that the toll selector 100 receives the first digit 1 and the second digit 1 in order to effect the selection of an idle outgoing trunk in the group including the outgoing trunk 102. In response to the first digit 1, the toll selector 100 is operated in the manner previously explained, whereby the lower and upper wiper sets 191 and 192 respectively select the groups of outgoing trunks respectively including the outgoing trunks 102 and 103. Now in the present case, when the line relay R120 receives the second digit 2, it restores and reoperates twice in succession in accordance with the two impulses of the digit 2. During the second digit 2, upon the first restoration of the line relay R120, the rotary relay R150 is operated and the count relay R160 is operated through its first step; then upon the first reoperation of the line relay R120, the count relay R160 is operated through its second step; all in the manner previously explained. Now during the second digit, upon the second restoration of the line relay R120, there is completed, at the contacts 122, a circuit, including the contacts 119, 133, 144, 153 and 164, for energizing the upper winding of the count relay R180 in order to cause the latter relay to operate. Upon operating, the count relay R180 completes, at the contacts 189, a holding circuit, including the contacts 131, for energizing the lower winding thereof. Further the count relay R180 interrupts, at the contacts 182, 184, 186 and 188, the normal connections to the lower wiper set 191; and completes, at the contacts 181, 183, 185 and 187, corresponding connections to the upper wiper set 192. Now at the conclusion of the second digit 2, the line relay R120 is retained in its operated position; and shortly thereafter the rotary relay R150 restores, the latter relay being of the slow-to-release type remaining operated during the second digit. Upon restoring, the rotary relay R150 completes, at the contacts 152, the circuit for operating the rotary magnet M194, whereby the rotary magnet M194 cooperates with the step relay R170 in the manner previously explained in order to cause the upper wiper set 192 to select an idle outgoing trunk in the group including the outgoing trunk 103. For reference purposes, it may be assumed that the particular outgoing trunk 103 is selected by the upper wiper set 192, the outgoing trunk 103 being marked as idle by the absence of potential upon the hold conductor thereof, whereby the switch through relay R110 is operated in the manner previously explained in order to arrest further rotation of the wiper carriage of the Strowger mechanism 190 and to complete the connection between the incoming trunk 101 and the upper wiper set 192 and consequently the connection to the outgoing trunk 103 and thus to the succeeding toll switch train. When the toll selector 100 is operated into its switched-through position in the present case by operation of the switch through relay R110, the line relay R120, the hold relay R130, and the count relay R160 restore in the manner previously explained. However, the switch through relay R110 is retained in its operated position by virtue of the application of ground potential upon the hold conductor of the incoming trunk 101 in the preceding toll switch train. Also this application of ground potential upon the hold conductor of the incoming trunk 101 completes a multiple holding circuit, including the contacts 189, for retaining energized the lower winding of the count relay R180 so that the latter relay is retained in its operated position, the count relay R180 constituting a wiper switching relay, as previously noted.

At the conclusion of the established connection, in response to a release that is performed over the preceding toll switch train, ground potential is removed from the hold conductor of the incoming trunk 101 effecting the release of the toll selector 100 and the succeeding toll switch train. Specifically, the removal of ground potential from the hold conductor of the incoming trunk 101 effects the restoration of the switch through relay R110 and the consequent release of the Strowger mechanism 190 in the manner previously explained. Also the count relay R180 is restored so as to transfer, at the contacts 181 to 188, inclusive, the connections from the upper wiper set 192 to the lower wiper set 191. At this time, the toll selector 100 is completely released and available for further use.

Now assuming that a connection is to be extended via the toll switch train by way of the toll selector 100 and by way of one of the outgoing trunks in the group including the outgoing trunk 104, the toll selector 100 is marked as idle to the preceding toll switch train by the absence of potential upon the hold conductor of the incoming trunk 101 and is seized in the manner previously explained effecting operation of the line relay R120, the hold relay R130 and the transfer relay R140. In this case, the toll selector 100 receives a single digit, and for reference purposes, it may be assumed that the single digit is the digit 2. Specifically, the line relay R120 follows the single digit 2, causing the lower wiper set 191 to select in the lower contact bank the group of outgoing trunks, including the outgoing trunk 104, the upper wiper set 192, making no selection of outgoing trunks in the upper contact bank in its corresponding position. Also when the wiper carriage of the Strowger mechanism 190 is driven two steps in the vertical direction away from its normal vertical position, the set of switch springs S128 is operated to complete a circuit, including the contacts 131, 142, 132 and 195 for operating the step relay R170. Upon operating the step relay R170 completes, at the contacts 172, a holding circuit, including the contacts 119 and 132, the set of switch springs S128 and the contacts 195, for energizing the winding thereof.

At the conclusion of the single digit 2, the line relay R120 is retained in its operated position retaining operated the hold relay R130 and effecting the restoration of the transfer relay R140 shortly thereafter, the latter relay being of the slow-to-release type. Upon restoring, the transfer relay R140 completes, at the contacts 143, a circuit, including the contacts 131, 152 and 171, for operating the rotary magnet M194, whereby the wiper carriage of the Strowger mechanism 190 is driven one step in the rotary direction away from its normal rotary position. Also the rotary magnet M194 interrupts, at the contacts 195, the holding circuit for retaining operated the step relay R170 in order to cause the latter relay to restore and interrupt, at the contacts 171, the circuit for operating the rotary magnet M194. Accordingly the rotary magnet M194 and the step relay R170 interact in the previously-described manner, in order to drive the wiper carriage of the Strowger mechanism 190 step-by-step in the rotary direction so that the lower wiper set 191 may search for an idle outgoing trunk in the group including the outgoing trunk 104. When the lower wiper set 191 selects an idle outgoing trunk, such, for example, as the outgoing trunk 104 in the group noted, no potential is encountered by the hold wiper of the lower wiper set 191, since the idle outgoing trunk 104 is marked as idle by the absence of potential upon the hold conductor thereof. In passing, it is noted that the presence of ground potential upon the hold conductor of a busy outgoing trunk in the group noted causes the application of ground potential to the hold wiper of the lower wiper set 191 so as to complete an alternative circuit, including the contacts 188, 116 and 132, the set of switch springs S128 and the contacts 195 for reoperating the step relay R170. However when the idle outgoing trunk 104 is selected by the lower wiper set 191, the above-traced circuit is not completed; whereby an alternative circuit is completed for energizing the winding of the switch through relay R110 in series with the winding of the switch through relay R110 in series with the winding of the step relay R170. The last-mentioned circuit extends from ground by way of the contacts 131, the set of switch springs S125, the winding of the switch through relay R110, the contacts 132, the set of switch springs S128, the contacts 195, and the winding of the step relay R170 to battery. When this circuit is completed, the switch through relay R110 operates but the step relay R170 does not operate as it is of the marginal type. When the switch through relay R110 thus operates, further rotation of the wiper carriage of the Strowger mechanism 190 is arrested and the toll selector 100 is switched through in the manner previously explained effecting a connection between the incoming trunk 101 and the lower wiper set 191 and consequently via the selected outgoing trunk 104 to the succeeding toll switch train.

At the conclusion of the established connection, ground potential in the preceding toll switch train is removed from the hold conductor of the incoming trunk 101, thereby to effect the release of the toll selector 100 and the succeeding toll switch train in a manner substantially identical to that previously explained. In this case, when the wiper carriage of the Strowger mechanism 190 is released and returned to its normal rotary and vertical positions, the set of switch springs S128 is operated to its open position. At this time, the toll selector 100 is completely released and is available for further use.

Incident to the operation of the toll selector 100 to select an idle outgoing trunk in any one of the groups respectively including the outgoing trunks 102, 103 and 104, it may occur that all of the outgoing trunks in the particular group are busy. Specifically following the two digits 1 and 1, all of the outgoing trunks in the group including the outgoing trunk 102 may be tested as being busy; following the two digits 1 and 2, all of the outgoing trunks in the group including the outgoing trunk 103 may be tested as being busy; and following the signal digit 2, all of the outgoing trunks in the group including the outgoing trunk 104 may be tested as being busy. In any case, operation of the Strowger mechanism 190 in the rotary direction continues until the wiper carriage thereof is driven eleven steps in the rotary direction away from its normal rotary position, whereby the sets of switch springs S125, S126 and S127 are operated. More particularly, the set of switch springs S125 is operated to its open position in order positively to prevent operation of the switch through relay R110; the set of switch springs S126 is operated into its closed position in order to complete a path, including the contacts 131, for applying ground potential to the alarm conductor C137; and the set of switch springs S127 is operated into its closed position in order to complete a connection including the resistor 137 between the busy conductor C136 and the control conductor of the incoming trunk 101. The application of ground potential to the alarm conductor C137 is effected to bring about an alarm after a predetermined time interval; and in passing, it is noted that this alarm is brought about in the event the transfer relay R140 is retained in its operated position for the time interval mentioned following seizure of the toll selector 100. Specifically the transfer relay R140 completes, at the contacts 141, a path for applying ground potential to the alarm conductor C137 during the short time interval that the transfer relay R140 occupies its operated position following seizure of the toll selector 100 and prior to the reception of the first digit. Ground impulses at a rate of 120 per minute are applied to the busy conductor C136 in order to bring about corresponding flashing of supervisory equipment associated with the toll operator position connected to the preceding toll switch train so as to render to the operator thereat an "all-trunks-busy" supervision. Upon receiving the busy supervision noted when the toll selector 100 encounters the "all-trunks-busy" condition, the operator at the toll switchboard performs a release control over the preceding toll switch train so as to effect the restoration of the line relay R120 and the consequent restoration of the hold relay R130 shortly thereafter. Upon restoring, the hold relay R130 completes, at the contacts 134, the previously-traced circuit for operating the release magnet M196 so as to effect the release of the Strowger mechanism 190 in the manner previously explained. Also upon restoring, the hold relay R130 interrupts, at the contacts 131, the path for applying ground potential in the toll selector 100 to the hold conductor of the incoming trunk 101 in order again to mark as idle the toll selector 100 to the preceding toll switch train.

Referring now more particularly to Fig. 2, the toll selector repeater 200 there illustrated and embodying the features of the present invention is of the combination one-digit and two-digit type. The selector repeater 200 comprises a Strowger mechanism 300 including a lower wiper set 301 and an upper set 302, as well as lower and upper contact banks respectively accessible to the two wiper sets noted; each of the contact banks comprises a plurality and maximum of ten vertically spaced-apart levels or rows of individual contact sets disposed in spaced relation in the rotary direction; and certain of the levels of contact sets in the respective lower and upper contact banks are paired so that the respective lower and upper wiper sets 301 and 302 have simultaneous access thereto.

Further, the toll selector repeater 200 occupies an intermediate position in a toll switch train, and further includes an incoming trunk 201 that is accessible to preceding toll switching apparatus, not shown, that is, in turn, accessible to a toll operator switchboard, not shown. Also the contact sets provided in the various levels of the lower and upper contact banks terminate groups of trunks extending to succeeding toll switching apparatus, not shown. The portions of the toll switch train preceding and succeeding the toll selector repeater 200 have not been illustrated in the interest of brevity.

Specifically in the contact banks of the Strowger mechanism 300, the lower wiper set 301 has access to a level of contact sets terminating a group of outgoing trunks 202, etc., and the upper wiper set 202, etc., has access to a level of contact sets terminating a group of outgoing trunks 203, etc., these levels in the respective lower and upper contact banks being paired with respect to each other so that the respective lower and upper wiper sets 301 and 302 have simultaneous access to the outgoing trunks 202 and 203. Also the lower contact bank of the Strowger mechanism 300 comprises a level of contact sets terminating a group of outgoing trunks 204, etc., and a level of contact sets terminating a group of outgoing trunks 205, etc., both accessible to the lower wiper set 301. In the toll selector repeater 200, the incoming trunk 201 comprises a pair of line conductors, a hold conductor, and a control conductor respectively marked +, −, C and EC. Also each of the outgoing trunks 202, etc., comprises a pair of line conductors, a hold conductor and a control conductor.

Further the Strowger mechanism 300 comprises a vertical magnet M303 for driving the wiper carriage, mounting the lower and upper wiper sets 301 and 302, step-by-step in the vertical direction away from its normal vertical position, a rotary magnet M304 for driving the wiper carriage step-by-step in the rotary direction away from its normal rotary position, and a release magnet M306, for releasing the wiper carriage and for causing it to be returned to its normal rotary and vertical positions. Also associated with the wiper carriage of the Strowger mechanism 300 are two sets of switch springs S301 and S302 that are operated when the wiper carriage is moved one step in the vertical direction away from its normal vertical position, and two sets of switch springs S303 and S304 that are operated when the wiper carriage is moved eleven steps in the rotary direction away from its normal rotary position. Finally a set of switch springs S305 is associated with the wiper carriage of the Strowger mechanism 300 that is operated when the wiper carriage is moved in the vertical direction predetermined numbers of steps corresponding to the level of the group of trunks 204, etc., appearing before the lower wiper set 301 or corresponding to the level of the group of trunks 205, etc., appearing before the lower wiper set 301, as well as a set of switch springs S306 that is operated when the wiper carriage is moved in the vertical direction a predetermined number of steps corresponding to the level of the group of trunks 205, etc., appearing before the lower wiper set 301. Finally the toll selector repeater 200 comprises a repeating unit including inductively coupled primary coils 226 and 228 and secondary coils 227 and 229, as well as a relay group including a repeater cutout relay R210, an answer relay R220, a supervisory relay R230, a switch through relay R240, a line relay R250, a hold relay R260, a transfer relay R270, a rotary relay R275, a count relay R280, a step relay R285, and a count or wiper switching relay R290.

First assuming that a connection is to be extended via the toll switch train by way of the toll selector repeater 200 and by way of one of the outgoing trunks in the group including the outgoing trunk 202, the toll selector repeater 200 is marked as idle to the preceding toll switch train by the absence of potential upon the hold conductor of the incoming trunk 201 extending thereto. When the preceding toll switch train seizes the toll selector repeater 200 via the incoming trunk 201, ground potential is applied to the hold conductor of the incoming trunk 201, and a circuit is completed for energizing the upper winding of the line relay R250 in order to cause the latter relay to operate. Specifically, battery potential in the preceding toll switch train is applied to the control conductor of the incoming trunk 201 completing the above-mentioned circuit to ground potential in the toll selector repeater 200 and including the contacts 217 and 234, as well as the upper winding of the line relay R250. Upon operating the line relay R250 completes, at the contacts 252, a circuit, including the contacts 219, for operating the hold relay R260. Upon operating, the hold relay R260 completes, at the contacts 263, a path for applying ground potential to the hold conductor of the incoming trunk 201 in order further to retain operated the preceding toll switch train. Further the hold relay R260 completes, at the contacts 261, a circuit for energizing the right-hand winding of the answer relay R220, and a multiple circuit, including the set of switch springs S302, for energizing the lower winding of the transfer relay R270. The answer relay R220 is of the polarized type, and does not operate incident to energization of the right-hand winding thereof until the left-hand winding thereof is energized in a predetermined direction. However the transfer relay R270 operates.

At this time, the first digit is received over the control conductor of the incoming trunk 201 in order to cause the line relay R250 to follow; and it may be assumed that this first digit is the digit 1. Accordingly the line relay R250 restores and then reoperates interrupting and then recompleting, at the contacts 252, the circuit for retaining operated during impulsing the hold relay R260, the latter relay being of the slow-to-release type. Also the line relay R250 completes and then interrupts, at the contacts 253, a multiple circuit, including the contacts 219, 265, and 274, for energizing the upper winding of the transfer relay R270 and for operating the vertical magnet M303 of the Strowger mechanism 300 in order to retain the transfer relay R270 in its operated position during impulsing, as it is of the slow-to-release type, and in order to operate the vertical magnet M303 so as to drive the wiper carriage of the Strowger mechanism one step in the vertical direction away from its normal vertical position. When the wiper carriage of the Strowger mechanism 300 is thus driven one step in the vertical direction away from its normal vertical position the sets of switch springs S301 and S302 operate. Specifically the set of switch springs S301 is closed to prepare a circuit traced hereinafter for operating the release magnet M306 of the Strowger mechanism 300; and the set of switch springs S302 is opened in order to interrupt the circuit for energizing the lower winding of the transfer relay R270. Also when the wiper carriage of the Strowger mechanism 300 is driven one step in the vertical direction away from its normal vertical position the lower and upper wiper sets 301 and 302 are moved together so that they respectively select the two groups of outgoing trunks respectively including the outgoing trunks 202 and 203. In passing, it is noted that the count relay R290 normally occupies its restored position so that the lower wiper set 301 is normally effectively selected at the contacts 292, 294, 296 and 299.

At the conclusion of the first digit 1, the line relay R250 is retained in its operated position in order to retain operated the hold relay R260 so that the transfer relay R270 restores shortly thereafter, the latter relay being of the slow-to-release type. Upon restoring, the transfer relay R270 interrupts, at the contacts 274, a further point in the circuit for operating the vertical magnet M303 and prepares at the contacts 273, a point in a circuit traced hereinafter for energizing the winding of the rotary relay R275.

When the second digit is received, the line relay R250 again follows; and in the present instance, the second digit is the digit 1. Accordingly line relay R250 restores and then reoperates retaining operated the hold relay R260 during impulsing as it is of the slow-to-release type. Also the line relay R250 upon restoring completes, at the contacts 253, the previously mentioned circuit, including the contacts 219, 265, 273 and 231 for energizing the winding of the rotary relay R275, as well as a multiple circuit, including the contacts 243 and 281, for energizing the upper winding of the count relay R280. The rotary relay R275 operates to complete, at the contacts 276, a path including the resistor 233 for short-circuiting the left-hand winding of the answer relay R220 and the windings 227 and 229 of the repeating unit 225 for a purpose more fully explained hereinafter. The count relay R280 operates only through its first step; this relay being of the two-step type. Upon operating through its first step, the count relay R280 completes, at the contacts 283, a path, including the contacts 261, for short-circuiting the lower winding thereof. The path for short-circuiting the lower winding of the count relay R280 also includes the contacts 281, 243, 231, 273, 265, 253 and 219. When the line relay R250 then reoperates at the conclusion of the second digit 1, it interrupts, at the contacts 253, the previously traced circuit for energizing the winding of the rotary relay R275 and the previously traced multiple path for short-circuiting the lower winding of the count relay R280. When the path mentioned for short-circuiting the lower winding of the count relay R280 is thus interrupted, there is completed a circuit, including the contacts 261 and 283, for energizing in series the lower and upper windings of the count relay R280; whereby the latter relay operates through its second step, it being of the two-step type as previously noted. When the count relay R280 operates through its second step, it interrupts, at the contacts 281, a further point in the previously traced circuit for energizing the upper winding thereof, and prepares, at the contacts 282, a point in a circuit that is not employed in the present instance, but that is used in an operation subsequently described for energizing the upper winding of the count relay R290. Also the count relay R280 completes, at the contacts 284, a circuit, including the contacts 305, 277, 272, 248 and 263, for operating the step relay R285. Upon operating the step relay R285 completes, at the contacts 287, a holding circuit, including the contacts 243′, 284 and 305, for energizing the winding thereof; and prepares, at the contacts 286, a circuit traced hereinafter for operating the rotary magnet M304 of the Strowger mechanism 300.

At the conclusion of the second digit 1, the line relay R250 is retained in its operated position retaining operated the hold relay R260 so that the rotary relay R275 restores shortly thereafter, it being of the slow-to-release type. Upon restoring, the rotary relay R275 completes, at the contacts 278, the previously mentioned circuit, including the contacts 286, 272, 248 and 263, for operating the rotary magnet M304; whereby the wiper carriage of the Strowger mechanism 300 is driven away from its normal rotary position one step in the rotary direction so that the lower wiper set 301 and the upper wiper set 302 are moved together and respectively select the first outgoing trunks in the groups respectively including the outgoing trunks 202 and 203. However, in the present example, only the outgoing trunk in the group selected by the lower wiper set 301 is tested by the switch through relay R240 by virtue of the circumstance that the lower piper set 301 is selected by the restored position of the count relay R290. Also upon operating, the rotary magnet M304 interrupts, at the contacts 305, the holding circuit for retaining operated the step relay R285. Upon restoring, the step relay R285 interrupts, at the contacts 287, a further point in the holding circuit for energizing the winding thereof; and interrupting, at the contacts 286, the circuit for operating the rotary magnet M304 so that the rotary magnet M304 is restored.

More particularly, at this time, ground potential, at the contacts 263, is applied via the right-hand contact of the set of switch springs S304, the winding of the switch through relay R240 and the contacts 241' and 299 to the hold wiper of the lower wiper set 301; whereby the switch through relay R240 performs the busy test noted. Specifically, in the event the first outgoing trunk in the group, including the outgoing trunk 202 is busy at this time, ground potential appears on the hold conductor thereof, whereby a path substantially identical to that traced above is completed for shirt-circuiting the winding of the switch through relay R240 so as to prevent operation of the latter relay. Also in this event, the application of ground potential upon the hold conductor of the first outgoing trunk mentioned completes a circuit, including the hold wiper of the lower wiper set 301, the contacts 299, 241', 284 and 305, for reoperating the step relay R285. Upon reoperating, the step relay R285 again completes, at the contacts 287, the holding circuit for energizing the winding thereof; and again completes, at the contacts 286, the circuit for operating the rotary magnet M304. Accordingly, it will be understood that the step relay R285 and the rotary magnet M304 interact to effect successive stepping of the wiper carriage of the Strowger mechanism 300 so long as busy outgoing trunks in the group, including the outgoing trunk 202, are encountered by the hold wiper of the lower wiper set 301.

When, however, an idle outgoing trunk in the group, including the outgoing trunk 202, is selected by the lower wiper set 301, further operation of the Strowger mechanism 300 in the rotary direction is arrested by virtue of the absence of potential upon the hold conductor of the outgoing trunk noted. Specifically, in this case, the absence of ground potential upon the hold conductor of the outgoing trunk noted prevents completion of the path for short-circuiting the winding of the switch through relay R240; and prevents completion of the direct circuit for energizing the winding of the step relay R285. More specifically, in this case, a circuit, including the contacts 263, the right-hand contacts of the set of switch springs S304 and the contacts 284 and 305, is completed for energizing in series the winding of the switch through relay R240 and the winding of the step relay R285. When this series circuit is thus completed, the switch through relay R240 operates; however, the step relay R285 does not operate as the latter relay is of the marginal type. Upon operating, the switch through relay R240 completes, at the contacts 242', a holding circuit, including the contacts 305, the right-hand contacts of the set of switch springs S304 and the contacts 263 for energizing the winding thereof in series with the winding of the step relay R285. Further the switch through relay R240 interrupts, at the contacts 241', a further point in the above traced test circuit extending to the hold wiper of the lower wiper set 301; and completes, at the contacts 249, a direct path, including the contacts 299, for applying ground potential to the hold wiper of the lower wiper set 301 and consequently to the hold conductor of the selected outgoing trunk in the group, including the outgoing trunk 202. Further the switch through relay R240 completes, at the contacts 241 and 244, a connection, including the contacts 211 and 214 between the series connected windings 226 and 228 of the repeating unit 225 and the line conductors of the incoming trunk 201; and completes, at the contacts 242 and 245, a connection, including the contacts 213, 251, 216, 292 and 294, between the series connected windings 227 and 229 of the repeating unit 225 and the left-hand winding of the answer relay R220, and the line wipers of the lower wiper set 301. Also the switch through relay R240 completes, at the contacts 246, a connection, including the contacts 218' and 296, between the winding of the supervisory relay R230 and the control wiper of the lower wiper set 301.

At this time, the left-hand winding of the answer relay R220 is connected in series relation with the windings 227 and 229 of the repeating unit 225 and is thus bridged across the line wipers of the lower wiper set 301 and consequently across the line conductors of the selected outgoing trunk in the group, including the outgoing trunk 202. For reference purposes, it may be assumed that the particular outgoing trunk 202 is selected at this time, whereby the succeeding toll switch train is seized as a consequence of the bridging of the left-hand winding of the answer relay R220 across the line conductors thereof and the direct application of ground potential to the hold conductor thereof, so that the succeeding switch train is conditioned to receive a digit repeated thereto from the toll selector repeater 200. In passing, it is noted that incident to the restoration of the rotary relay R275, at the conclusion of the second digit, there is interrupted, at the contacts 276, the previously mentioned path for short-circuiting the left-hand winding of the answer relay R220 and the windings 227 and 229 of the repeating unit 225. While the left-hand winding of the answer relay R220 is energized at this time, the latter relay is not poled to operate, it being of the polarized type. At this time, the toll selector repeater 200 has operated to select the outgoing trunk 202 in order to effect seizure of the succeeding switch train and the toll selector repeater 200 has switched through and is in readiness to repeat over line conductors of the outgoing trunk 202 one or more digits received over the control conductor of the incoming trunk 201.

Now assuming that a digit is received over the control conductor of the incoming trunk 201, the line relay R250 follows retaining the hold relay R260 in its operated position as the latter relay is of the slow-to-release type. Also each time the line relay R250 restores and then reoperates, it completes and then interrupts, at the contacts 253, the previously traced circuit for energizing the winding of the rotary relay R275 in order to cause the latter relay to operate and remain operated during impulsing as it is of the slow-to-release type. Upon operating, the rotary relay R275 completes, at the contacts 276, the path for short-circuiting the left-hand winding of the answer relay R220 and the windings 227 and 229 of the repeating unit 225 in order to improve impulsing over the line wipers of the lower wiper set 301. Further each time the line relay R250 restores and then reoperates it interrupts and then recompletes, at the contacts 251, the impulsing path, including the contacts 292, 242, and 213, the resistor 223 and the contacts 276, 216, 245 and 294, extending between the line wipers of the lower wiper set 301 and consequently between the line conductors of the outgoing trunk 202 in order to control the operation of the succeeding switch train. Thus it will be understood that a digit received over the control conductor of the incoming trunk 201 by the toll selector repeater 200 is repeated at this time over the line conductors of the outgoing trunk 202 to the succeeding switch train in order to effect operation thereof. In response to one or more digits repeated by the toll selector repeater 200 over the outgoing trunk 202, the succeeding switch train extends the connection to its destination; and when the call is answered the succeeding switch train operates to effect the reversal of battery potential over the line conductors of the outgoing trunk 202, whereby the left-hand winding of the answer relay R220 is poled to operate, the rotary relay R275 having restored shortly following the conclusion of any digit that is repeated by the toll selector repeater 200. Upon operating, the answer relay R220 completes, at the contacts 221, a circuit for operating the supervisory relay R230. Upon operating, the supervisory relay R230 interrupts, at the contacts 231, a further point in the circuit for energizing the winding of the rotary relay R275; interrupting, at the contacts 234, the previously traced circuit for energizing the upper winding of the line relay R250; and completes, at the contacts 233, an alternative circuit, including the contacts 217, for energizing in series the lower and upper windings of the line relay R250. More specifically, upon operating, the supervisory relay R230 disconnects the upper low resistance winding from the control conductor of the incoming trunk 201 and connects in series the lower high resistance winding and the upper low resistance winding of the line relay R250 to the control conductor of the incoming trunk 201; whereby the resistance from the ground potential applied to the control conductor of the incoming trunk 201 is changed from low to high. This change in resistance from ground potential that is applied to the control conductor of the incoming trunk 201 incident to operation of the answer relay R220 as a consequence of answering of the extended connection comprises an answer signal that is transmitted over the control conductor of the incoming trunk 201 and the preceding toll switch train to the toll operator switchboard and is appropriately converted into an answer signal at the toll operator switchboard.

At the conclusion of the established connection, when the called destination performs a release operation, the succeeding toll switch train again reverses the polarity of the line conductors of the outgoing trunk 202, whereby the answer relay R220 restores effecting the restoration of the supervisory relay R230. Upon restoring, the supervisory relay R230 again changes, at the contacts 233 and 234, the connection of ground potential to the control conductor of the incoming trunk 201, whereby lower resistance ground potential is substituted for higher resistance ground potential as a consequence of the exclusion of the lower high resistance winding of the line relay R250 so that a disconnect signal is returned over the control conductor of the incoming trunk 201 in order to render to the toll operator switchboard via the preceding toll switch train, a corresponding disconnect signal.

The operator at the toll switchboard effects the release of the preceding toll switch train, whereby ground potential is removed from the hold conductor of the incoming trunk 201, and battery potential is removed from the control conductor of the incoming trunk 201 effecting the restoration of the line relay R250. Upon restoring, the line relay R250 interrupts, at the contacts 251, the loop circuit extending via the line conductors of the outgoing trunk 202 to the succeeding switch train in order to effect the release thereof. Also the line relay R250 interrupts, at the contacts 252, the circuit for retaining operated the hold relay R260 in order to cause the latter relay to restore shortly thereafter, it being of the slow-to-release type. Upon restoring, the hold relay R260 completes, at the contacts 266, a circuit, including the contacts 219, 253, 244′ and the set of switch springs S301, for operating the release magnet M306; whereby the wiper carriage of the Strowger mechanism 300 is released and returned to its normal rotary and vertical positions. When the wiper carriage of the Strowger mechanism 300 is thus released, the sets of switch springs S301 and S302 are operated. Specifically, the set of switch springs S301 is opened to interrupt the circuit for operating the release magnet M306; and the set of switch springs S302 is closed to prepare the circuit for energizing the lower winding of the transfer relay R270. Further the hold relay R260 interrupts, at the contacts 263, the holding circuit for retaining operated the switch through relay R240 and the multiple path for applying ground potential to the hold conductor of the incoming trunk 201 in order again to mark the incoming trunk 201 as idle to the preceding toll switch train. Upon restoring, the switch through relay R240 interrupts, at the contacts 249, the path for applying ground potential to the hold wiper of the lower wiper set 301; and upon restoring, the hold relay R260 interrupts, at the contacts 261, the holding circuit for retaining operated the count relay R280 and the multiple circuit for energizing the right-hand winding of the answer relay R220. At this time, the toll selector repeater 200 is completely released and available for further use.

Reconsidering the extension of the connection via the toll switch train by way of the toll selector repeater 200, it will be understood that should the succeeding toll switch train encounter an "all-trunks-busy" condition following operation of the toll selector repeater 200 into its switched-through position, that 120 ground impulses per minute are returned over the control conductor of the outgoing trunk 202 so as to complete a direct circuit, including the contacts 296, 246 and 218′, for energizing the supervisory relay R230 so as to cause the latter relay to operate and restore intermittently. Each time the supervisory relay R230 operates and restores, it changes, at the contacts 233 and 234, the resistance in the ground connection via the upper winding of the line relay R250 or via the upper and lower windings of the line relay R250 to the control conductor of the incoming trunk 201 so as to return the "all-trunks-busy" signal to the toll switchboard in a manner substantially identical to the return of other supervisory signals thereto, as explained above.

Now assuming that a connection is to be extended via the toll switch train by way of the toll selector repeater 200 and by way of one of the outgoing trunks in the group, including the outgoing trunk 203, the toll selector repeater 200 is marked as idle to the preceding toll switch train by the absence of potential upon the hold conductor of the incoming trunk 201 and is seized in the manner previously explained effecting operation of the line relay R250, the hold relay R260 and the transfer relay R270, as well as the energization of the right hand winding of the answer relay R220. In this case, the toll selector repeater 200 receives the first digit 1 and the second digit 2, based upon the prior assumption that the toll selector repeater 200 receives the first digit 1 and the second digit 1 in order to effect the selection of an idle outgoing trunk in the group including the outgoing trunk 202. In response to the first digit 1, the toll selector repeater 200 is operated in the manner previously explained, whereby the lower and upper wiper sets 301 and 302 respectively select the groups of outgoing trunks respectively including the outgoing trunks 202 and 203. Now in the present case, when the line relay R250 receives the second digit 2, it restores and reoperates twice in succession in accordance with the two impulses of the digit 2. During the second digit 2, upon the first restoration of the line relay R250, the rotary relay R275 is operated and the count relay R280 is operated through its first step; then upon the first reoperation of the line relay R250, the count relay R280 is operated through its second step; all in the manner previously explained. Now during the second digit, upon the second restoration of the line relay R250, there is completed, at the contacts 253, a circuit, including the contacts 219, 265, 273, 231, 243 and 282, for energizing the upper winding of the count relay R290 in order to cause the latter relay to operate. Upon operating, the count relay R290 completes, at the contacts 2 7, a holding circuit, including the contacts 2 8, for energizing the lower winding thereof. Further, the count relay R290 interrupts, at the contacts 292, 294, 296 and 299, the normal connections to the lower wiper set 301; and completes, at the contacts 291, 293, 295 and 298, corresponding connections to the upper wiper set 302. Now at the conclusion of the second digit 2, the line relay R250 is retained in its operated position; and shortly thereafter the rotary relay R275 restores, the latter relay being of the slow-to-release type remaining operated during the second digit. Upon restoring, the rotary relay R275 completes, at the contacts 278, the circuit for operating the rotary magnet M304, whereby the rotary magnet M304 cooperates with the step relay R285 in the manner previously explained in order to cause the upper wiper set 302 to select an idle outgoing trunk in the group including the outgoing trunk 203. For reference purposes, it may be assumed that the particular outgoing trunk 203 is selected by the upper wiper set 302, the outgoing trunks 203 being marked as idle by the absence of potential upon the hold conductor thereof, whereby the switch through relay R240 is operated in the manner previously explained in order to arrest further rotation of the wiper carriage of the Strowger mechanism 300, to complete the connections between the line conductors of the incoming trunk 201 and the windings 226 and 228 of the repeating unit 225, to complete the connections between the windings 227 and 229 of the repeating unit 225 and the left-hand windings of the answer relay R220 and the line wipers of the upper wiper set 302, and to complete the connection between the ground potential and the hold wiper of the upper wiper set 302. Of course, the connections mentioned are extended via the various wipers of the upper wiper set 302 to the corresponding conductors of the outgoing trunk 203 and thus to the succeeding toll switch train. When the toll selector repeater 200 is operated into its switched-through position, in the present case by operation of the switch through relay R240, the line relay R250, the hold relay R260, and the count relays R280 and R290 are retained in their operated positions.

The subsequent operation of the toll selector repeater 200 to repeat one or more digits over the selected outgoing trunk 203 are the same as previously described. Moreover, the subsequent control of the answer relay R220 and the supervisory relay R230 so as to effect the return of corresponding supervisory signals to the toll switchboard, not shown, are the same as previously explained.

At the conclusion of the established connection, in response to a release that is performed over the preceding toll switch train, the line relay R250 is restored so as to effect the release of the toll selector repeater 200 and the succeeding toll switch train in a manner substantially identical to that previously explained. Specifically upon restoring, the line relay R250 effects the restoration of the hold relay R260 shortly thereafter, whereby the latter relay interrupts, at the contacts 263, the holding circuit for energizing the lower winding of the count relay R290 so that the latter relay is restored. The Strowger mechanism 300 is released in the manner previously explained; and upon restoring, the count relay R290 transfers, at the contacts 291, 292, 293, 294, 295, 296, 298 and 299, the connections from the upper wiper set 302 to the lower wiper set 301. At this time, the toll selector repeater 200 is completely released and available for further use.

Now assuming that a connection is to be extended via the toll switch train by way of the toll selector repeater 200 and by way of one of the outgoing trunks in the group including the outgoing trunk 204, the toll selector repeater 200 is marked as idle to the preceding toll switch train by the absence of potential upon the hold conductor of the incoming trunk 201 and is seized in the manner previously explained effecting operation of the line relay R250, the hold relay R260, and the transfer relay R270, as well as the energization of the right-hand winding of the answer relay R220. In this case, the toll selector repeater 200 receives a single digit, and for reference purposes, it may be assumed that the single digit is the digit 2. Specifically, the line relay R250 follows the single digit 2 causing the lower wiper set 301 to select in the lower contact bank the group of outgoing trunks, including the outgoing trunk 204, the upper wiper set 302 making no selection of outgoing trunks in the upper contact bank in its corresponding position. Also when the wiper carriage of the Strowger mechanism 300 is driven two steps in the vertical direction away from its normal vertical position, the set of switch springs S305 is operated to complete a circuit, including the contacts 305, 264, 271, 248 and 263, for operating the step relay R285. Upon operating, the step relay R285 completes, at the contacts 287, a holding circuit, including the contacts 243' and 264, the set of switch springs S305 and the contacts 305, for energizing the winding thereof.

At the conclusion of the single digit 2, the line relay R250 is retained in its operated position retaining operated the hold relay R260 and effecting the restoration of the transfer relay R270 shortly thereafter, the latter relay being of the slow-to-release type. Upon restoring, the transfer relay R270 completes, at the contacts 272, a circuit, including the contacts 286, 278, 248 and 263, for operating the rotary magnet M304; whereby the wiper carriage of the Strowger mechanism 300 is driven one step in the rotary direction away from its normal rotary position. Also the rotary magnet M304 interrupts, at the contacts 305, the holding circuit for retaining operated the step relay R285 in order to cause the latter relay to restore and interrupt, at the contacts 286, the circuit for operating the rotary magnet M304. Accordingly, the rotary magnet M304 and the step relay R285 interact in the previously-described manner in order to drive the wiper carriage of the Strowger mechanism 300 step-by-step in the rotary direction so that the lower wiper set 301 may search for an idle outgoing trunk in the group including the outgoing trunk 204. When the lower wiper set 301 selects an idle outgoing trunk, such, for example, as the outgoing trunk 204 in the group noted, no potential is encountered by the hold wiper of the lower wiper set 301 since the idle outgoing trunk 204 is marked as idle by the absence of potential upon the hold conductor thereof. In passing, it is noted that the presence of ground potential upon the hold conductor of a busy outgoing trunk in the group noted causes the application of ground potential to the hold wiper of the lower wiper set 301 so as to complete an alternative circuit, including the contacts 299, 241' and 264, the set of switch springs S305 and the contacts 305, for reoperating the step relay R285. However, when the idle outgoing trunk 204 is selected by the lower wiper set 301, the above traced circuit is not completed, whereby an alternative circuit is completed for energizing the winding of the switch through relay R240 in series with the winding of the step relay R285. The last mentioned circuit extends from ground by way of the contacts 263, the right-hand contacts of the set of switch springs S304, the winding of the switch through relay R240, the contacts 264, the set of switch springs S305, the contacts 305 and the winding of the step relay R285 to battery. When this circuit is completed, the switch through relay R240 operates, but the step relay R285 does not operate as it is of the marginal type. When the switch through relay R240 is thus operated, further rotation of the wiper carriage of the Strowger mechanism 300 is arrested and the toll selector repeater 200 is switched-through in the manner previously explained effecting a connection between the incoming trunk 201 and the repeating unit 225 and a connection between the repeating unit 225 and the lower wiper set 301 and consequently via the selected outgoing trunk 204 to the succeeding toll switch train. The repeating of digits by the toll selector repeater 200 that are received over the control conductor of the incoming trunk 201 over the line conductors of the outgoing trunk 204 as well as the operation thereof in response to the various supervisory signals are the same as previously described. At the conclusion of the established connection and in response to a release that is performed over the preceding toll switch train, the toll repeater 200 is released, as well as the succeeding switch train; all in the manner previously explained. At this time, the toll selector repeater 200 is completely released and is available for further use.

Now assuming that a connection is to be extended via the toll switch train by way of the toll selector repeater 200 and by way of one of the outgoing trunks in the group including the outgoing trunk 205, the toll selector repeater 200 is marked as idle to the preceding toll switch train by the absence of potential upon the hold conductor of the incoming trunk 201 and is seized in the manner previously explained effecting operation of the line relay R250, the hold relay R260 and the transfer relay R270, as well as the energization of the right-hand winding of the answer relay R220. In this case, the toll selector repeater 200 receives a single digit, and for reference purposes, it may be assumed that the single digit is the digit 3. Specifically, the line relay R250 follows the single digit 3 causing the lower wiper set 301 to select in the lower contact bank the group of outgoing trunks, including the outgoing trunk 205, the upper wiper set 302 making no selection of outgoing trunks in the upper contact bank in its corresponding position. Also when the wiper carriage of the Strowger mechanism 300 is driven three steps in the vertical direction away from its normal vertical position, both the set of switch springs S305 and the set of switch springs S306 are operated. The set of switch springs S306 is closed to prepare a circuit for operating the repeater cutout relay R210; while the set of switch springs S305 is closed to complete the previously-traced circuit for operating the step relay R285. Upon operating, the step relay completes, at the contacts 287, the previously-traced holding circuit for energizing the winding thereof.

At the conclusion of the single digit 3, the line relay R250 is retained in its operated position retaining operated the hold relay R260 and effecting the restoration of the transfer relay R270 shortly thereafter, the latter relay being of the slow-to-release type. Upon restoring, the transfer relay R270 completes, at the contacts 272, the previously-traced circuit for operating the rotary magnet M304; whereby the rotary magnet M304 and the step relay R285 interacted in the manner previously explained in order to cause the wiper carriage of the Strowger mechanism 300 to be driven step-by-step until the lower wiper set 301 selects an idle outgoing trunk in the previously selected group, including the outgoing trunk 205. For reference purposes, it may be assumed that the particular outgoing trunk 205 in the group noted is selected, whereby the switch through relay R240 is operated in the manner previously explained. In the present case, upon operating the switch through relay R240 completes, at the contacts 247, a circuit, including the contacts 263, and the set of switch springs S306 for operating the repeater cutout relay R210. Upon operating, the repeater cutout relay R210 interrupts, at the contacts 217, the previously traced circuit for energizing the upper winding of the line relay R250 in order to cause the latter relay to restore; and interrupts, at the contacts 219, the circuit for retaining operated the hold relay R260, whereby the latter relay is restored shortly thereafter. Also the repeater cut out relay R210 interrupts, at the contacts 211 and 214, the connections between the line conductors of the incoming trunk 201 and the windings 226 and 228 of the repeating unit 225; interrupts at the contacts 213 and 216, the connections between the windings 227 and 229 of the repeating unit 225 and the line wipers of the lower wiper set 301; and completes, at the contacts 212 and 215, direct connections, including the contacts 241, 242, 244, 245, 292 and 294, between the line conductors of the incoming trunk 201 and the line wipers of the lower wiper set 301 and consequently to the line conductors of the outgoing trunk 205. Further the repeater cut out relay R210 interrupts, at the contacts 218', the connection between the winding of the supervisory relay R230 and the control wiper of the lower wiper set 301; and completes, at the contacts 218, a direct connection, including the contacts 246 and 296, between the control conductor of the incoming trunk 201 and the control wiper of the lower wiper set 301.

Upon restoring, the hold relay R260 interrupts, at the contacts 263, the path for applying ground potential in the toll selector repeater 200 to the hold conductor of the incoming trunk 201; however, ground potential in the preceding toll switch train is retained upon the hold conductor of the incoming trunk 201 so as to retain operated the switch through relay R240 and the repeater cut out relay R210. The operated switch through relay R240 retains completed, at the contacts 249, the path for applying ground potential to the hold wiper of the lower wiper set 301, whereby the application of ground potential to the hold conductor of the outgoing trunk 205 retains operated the succeeding toll switch train. Further the hold relay R260 interrupts, at the contacts 261, the circuit for retaining operated the count relay R280, as well as the multiple circuit for energizing the right-hand winding of the answer relay R220. At this time, the toll selector repeater not only occupies its switched-through position but also its repeater cut-out position by virtue of the operated positions of the switch through relay R240 and the repeater cut out relay R210. Accordingly, the line conductors and the control conductor of the incoming trunk 201 are directly connected to the corresponding conductors of the outgoing trunk 205. Thus any digits that are transmitted at this time over the control conductor of the incoming trunk 201 are forwarded directly via the control conductor of the outgoing conductor 205 to the succeeding switch train in order to control operation thereof. Moreover any supervisory signals that are returned from the succeeding switch train via the line or control conductors of the outgoing trunk 205 are returned directly over the corresponding conductors of the incoming trunk 201 and the preceding toll switch train to the toll operator position, not shown. For example, should the succeeding toll switch train encounter an "all-trunks-busy" condition, the "all-trunks-busy" signal is applied to the control conductor of the outgoing trunk 205 and is returned directly via the control conductor of the incoming trunk 201 and the preceding toll switch train to the toll operator switchboard, not shown, and is converted into an appropriate "all-trunks-busy" signal.

At the conclusion of the established connection and in response to a release that is performed over the preceding toll switch train, ground potential is removed from the hold conductor of the incoming trunk 201 effecting the restoration of the switch through relay R240 and the repeater cut out relay R210 in the toll selector repeater 200. Upon restoring, the switch through relay R240 effects operation of the release magnet M306, whereby the Strowger mechanism 300 is released and returned to its normal rotary and vertical positions in the manner previously explained. In this case, the sets of switch springs S301, S302, S305 and S306 are operated when the wiper carriage of the Strowger mechanism 300 is thus released. Specifically, the set of switch springs S305 is opened to interrupt a further point in the circuit for operating the step relay R285; and the set of switch springs S306 is opened to interrupt a further point in the circuit for operating the repeater cut out relay R210. Also upon restoring, the repeater cut out relay R210 again prepares, at the contacts 211, 213, 214 and 216, the normal inclusion of the repeating unit 225 between the line conductors of the incoming trunk 201 and the line wipers of a lower wiper set 301. At this time, the toll selector repeater 200 is completely released and is available for further use.

Incident to the operation of the toll selector repeater 200 to select an idle outgoing trunk in any one of the groups respectively including the outgoing trunks 202, 203, 204 and 205, it may occur that all of the outgoing trunks in the particular group are busy. Specifically following the two digits 1 and 1 all of the outgoing trunks in the group, including the outgoing trunk 202, may be tested as being busy; following the two digits 1 and 2 all of the outgoing trunks in the group, including the outgoing trunk 203 may be tested as being busy; following the single digit 2 all of the outgoing trunks in the group, including the outgoing trunk 204, may be tested as being busy; and following the single digit 3, all of the outgoing trunks in the group, including the outgoing trunk 205, may be tested as being busy. In any case, operation of the Strowger mechanism 300 in the rotary direction continues until the wiper carriage thereof is driven eleven steps in the rotary direction away from its normal rotary position, whereby the sets of switch springs S303 and S304 are operated. More specifically, the set of switch springs S304 is operated to open the right-hand contacts thereof in order positively to prevent operation of the switch through relay R240. Also the set of switch springs S304 is operated to close the left-hand contacts thereof so as to complete a circuit, including the contacts 263, for operating the supervisory relay R230. Upon operating, the set of switch springs S303 is closed to prepare a connection between the busy conductor C222 and the upper winding of the line relay R250; which connection is completed, at the contacts 232, incident to operation of the supervisory relay R230. At this time, ground potential is connected via the lower winding of the line relay R250, the contact 233, the upper winding of the line relay R250 and the contacts 217 to the control conductor of the incoming trunk 201; and 120 ground impulses per minute are applied to the busy conductor C222, whereby ground potential is intermittently applied from the busy conductor C222 via the set of switch springs S303, the contacts 232, the upper winding of the line relay R250 and the contacts 217 to the control conductor of the incoming trunk 201. Accordingly the lower high resistance winding of the line relay R250 is intermittently short-circuited by the intermittent application of ground potential to the busy conductor C222 so that alternately low resistance ground potential and high resistance ground potential are returned via the upper winding of the line relay R250 and via the lower and upper windings of the line relay R250 to the control conductor of the incoming trunk 201 and thence by way of the preceding toll switch train to the toll switchboard, not shown, serving as an "all-trunks-busy" signal in the manner previously explained.

Upon receiving the busy supervision noted when the toll selector repeater 200 encounters the "all-trunks-busy" condition, the operator at the toll switchboard performs a release control over the preceding toll switch train so as to effect the restoration of the line relay R250 and the supervisory relay R230, whereby the toll selector repeater 200 is released in the manner previously explained.

In the foregoing description of the toll selector 100 and the toll selector repeater 200, it was explained that these automatic switches occupied intermediate positions in the associated toll switch trains. In fact, the toll selector repeater 200 and the toll selector 100 may occupy tandem intermediate positions in the same toll switch train. For example, in such an arrangement, the toll swithchboard, not shown, may have access to preceding toll switching apparatus, not shown, that has access to the toll selector repeater 200; the toll selector repeater 200 may have access to the toll selector 100; and the toll selector 100 may have access to succeeding toll switching apparatus, not shown. For instance, the outgoing trunk 204 appearing before the lower wiper set 301 in the Strowger mechanism 300 incorporated in the toll selector repeater 200 may in fact be the incoming trunk 101 extending to the toll selector 100; and the outgoing trunk 104 appearing before the lower wiper set 101 of the Strowger mechanism 190 incorporated in the toll selector 100 may terminate a conventional toll connector. In this arrangement, it will be understood that the operator at the toll switchboard selectively operates the preceding toll switching apparatus via the control conductor thereof, effecting seizure of the incoming trunk 201 extending to the toll selector repeater 200. The toll selector repeater 200 then receives the digit 2 via the control of the incoming trunk 201 and operates to select the outgoing trunk 204-incoming trunk 101 extending to the toll selector 100. The toll selector repeater 200 then receives the digit 2 via the control conductor of the incoming trunk 201, which is repeated by the line relay R250, at the contacts 251, via the line conductors of the outgoing trunk 204-incoming trunk 101 to the line relay R120 in the toll selector 100 in order to effect operation of the toll selector 100 to select the outgoing trunk 104 extending to the toll connector not shown. The toll selector repeater 200 then receives two additional digits via the control conductor of the incoming trunk 201, which are repeated via the line conductors of the toll selector 100 to the succeeding toll connector, not shown, in order to effect operation thereof to select a subscriber line having access thereto. In this case, in response to answering at the called subscriber substation the succeeding toll connector, not shown, operates to reverse battery over the line conductors of the outgoing trunk 104 so as to effect operation of the answer relay R220 in the toll selector repeater 200 and the consequent return of answer supervision by the supervisory relay R230 over the control conductor of the incoming trunk 201 and the preceding toll switching apparatus to the toll operator position, not shown. In this arrangement, it will be understood that supervisory signals originating at the called subscriber substation are returned via the line conductors of the succeeding toll switch train to the answer relay R220 in the toll selector repeater 200 and are there converted into supervisory signals that are returned via the control conductor of the preceding toll switch train to the toll operator position. Specifically as previously noted, the supervisory signals are converted by the supervisory relay R230 into high resistance and low resistance ground connections that are applied to the control conductor of the incoming trunk 201 and thence returned in this form over the control conductor of the preceding toll switch train to the toll operator switchboard, not shown.

In view of the foregoing, it is apparent that there has been provided automatic toll switching apparatus that embodies an improved and simplified wiper switching and supervisory control arrangement.

While there has been described which is at present considered to be the preferred embodiment of the invention, it will be understood that various modifications will be made therein, and it is intended to cover in the appended claims all such modifications as fall within the true spirit and scope of the invention.

What is claimed is:

1. In a telephone system, an automatic switch comprising a line, first and second wiper sets mounted for simultaneous selective primary and secondary movements, a first group of trunks accessible to said first wiper set, second and third groups of trunks respectively accessible to said first and second wiper sets, means responsive to a first digit signal transmitted over said line for imparting corresponding selective primary movement to said wiper sets to cause said first wiper set to select said first group of trunks or to cause said first and second wiper sets respectively to select said second and third groups of trunks, first means responsive to primary movement of said first wiper set to select said first group of trunks for initiating secondary movement of said wiper sets so that said first wiper set successively selects the individual trunks in said first group, a number of counting relays, means responsive to a second digit signal transmitted over said line for selectively operating said counting relays to register said second digit signal, means normally selecting said first wiper set, additional means responsive to operation of said counting relays to register a predetermined second digit signal for selecting said second wiper set, second means responsive jointly to primary movement of said first and second wiper sets respectively to select said second and third groups of trunks and to operation of at least one of said counting relays for initiating secondary movement of said wiper sets so that said first and second wiper sets successively select the individual trunks in said second and third groups respectively, a tester, and means controlled by said tester in response to the selection by said selected wiper set of an idle trunk in the selected group for arresting said secondary movement of said wiper sets and for completing a connection between said line and said selected wiper set.

2. In a telephone system, an automatic switch comprising a line, first and second wiper sets mounted for simultaneous selective primary and secondary movements, a first group of trunks accessible to said first wiper set, second and third groups of trunks respectively accessible to said first and second wiper sets, means responsive to a first digit signal transmitted over said line for imparting corresponding selective primary movement to said wiper sets to cause said first wiper set to select said first group of trunks or to cause said first and second wiper sets respectively to select said second and third groups of trunks, first means responsive to primary movement of said first wiper set to select said first group of trunks for initiating secondary movement of said wiper sets so that said first wiper set successively selects the individual trunks in said first group, first and second counting relays, means responsive to a second digit signal transmitted over said line for selectively operating said counting relays to register said second digit signal, said first counting relay being operated to register any value of said second digit signal and said second counting relay being operated to register a predetermined value of said second digit signal, said second counting relay having a normal restored position selecting said first wiper set and an operated position selecting said second wiper set, second means responsive jointly to primary movement of said first and second wiper sets respectively to select said second and third groups of trunks and to operation of said first counting relay for initiating secondary movement of said wiper sets so that said first and second wiper sets successively select the individual trunks in said second and third groups respectively, a tester, and means controlled by said tester in response to the selection by said selected wiper set of an idle trunk in the selected group for arresting said secondary movement of said wiper sets and for completing a connection between said line and said selected wiper set.

3. In a telephone system, an automatic switch comprising a line, first and second wiper sets mounted for simultaneous selective primary and secondary movements, first and second groups of trunks respectively accessible to said first and second wiper sets, a line relay, first means including said line relay and responsive to a first digit signal transmitted over said line for imparting corresponding selective primary movement to said wiper sets to cause said first and second wiper sets respectively to select said first and second groups of trunks, first and second counting relays, second means including said line relay and responsive to a second digit signal transmitted over said line for selectively operating said first and second counting relays so that said first counting relay is operated in the event said second digit signal has a value of one and so that said first and second counting relays are operated in the event said second digit signal has a value greater than one, said second counting relay having a normal restored position selecting said first wiper set and an operated position selecting said second wiper set, means controlled following the transmission of said second digit signal over said line for initiating secondary movement of said wiper sets so that said first and second wiper sets successively select the individual trunks in said first and second groups respectively, a tester, and means controlled by said tester in response to the selection by said selected wiper set of an idle trunk in the selected group for arresting said secondary movement of said wiper sets and for completing a connection between said line and said selected wiper set.

4. In a telephone system, an automatic switch comprising a line, a voice signal repeating unit, first and second wiper sets mounted for simultaneous selective primary and secondary movements, a first group of trunks accessible to said first wiper set, second and third groups of trunks respectively accessible to said first and second wiper sets, means responsive to a digit signal transmitted over said line for imparting corresponding selective primary movement to said wiper sets to cause said first wiper set to select said first group of trunks or to cause said first and second wiper sets respectively to select said second and third groups of trunks, first means responsive to primary movement of said first wiper set to select said first group of trunks for initiating secondary movement of said wiper sets so that said first wiper set successively selects the individual trunks in said first group, a register, means for registering another digit signal transmitted over said line in said register, means normally selecting said first wiper set, additional means responsive to the registration of a predetermined digit signal in said register for selecting said second wiper set, second means responsive jointly to primary movement of said first and second wiper sets respectively to select said second and third groups of trunks and to the registration of a digit signal in said register for initiating secondary movement of said wiper sets so that said first and second wiper sets successively select the individual trunks in said second and third groups respectively, a tester, means controlled by said tester in response to the selection by said selected wiper set of an idle trunk in the selected group for arresting said secondary movement of said wiper sets and for completing a connection between said line and said selected wiper set, and additional means selectively controlled in accordance with the primary movement of said wiper sets for respectively including and excluding said repeating unit in said connection between said line and said selected wiper set.

5. In a telephone system, an automatic switch comprising a line, a voice signal repeating unit, first and second wiper sets mounted for simultaneous selective primary and secondary movements, a first group of trunks accessible to said first wiper set, second and third groups of trunks respectively accessible to said first and second wiper sets, means responsive to a digit signal transmitted over said line for imparting corresponding selective primary movement to said wiper sets to cause said first wiper set to select said first group of trunks or to cause said first and second wiper sets respectively to select said second and third groups of trunks, a cut out relay, first means responsive to primary movement of said first wiper set to select said first group of trunks for conditioning said cut out relay and for initiating secondary movement of said wiper sets so that said first wiper set successively selects the individual trunks in said first group, a register, means for registering another digit signal transmitted over said line in said register, means normally selecting said first wiper set, additional means responsive to the registration of a predetermined digit signal in said register for selecting said second wiper set, second means responsive jointly to primary movement of said first and second wiper sets respectively to select said second and third groups of trunks and to the registration of a digit signal in said register for initiating secondary movement of said wiper sets so that said first and second wiper sets successively select the individual trunks in said second and third groups respectively, a tester, means controlled by said tester in response to the selection by said selected wiper set of an idle trunk in the selected group for arresting said secondary movement of said wiper sets and for operating said cut out relay in the event it is conditioned and for completing a connection between said line and said selected wiper set, said connection normally including said repeating unit, and means responsive to operation of said cut out relay for cutting said repeating unit out of said connection.

6. In a telephone system, an automatic switch comprising an incoming trunk including a pair of line conductors and a control conductor and a hold conductor, a wiper set including a pair of line wipers and a control wiper and a hold wiper, an outgoing trunk including a pair of line conductors and a control conductor and a hold conductor, a line relay, means controllable over the control conductor of said incoming trunk for selectively operating said line relay, a source of hold potential, means responsive to initial operation of said line relay for connecting said source of hold potential to the hold conductor of said incoming trunk, means responsive to subsequent restoration and reoperation of said line relay for operating said wiper set to select said outgoing trunk, a first relay, a second relay, means responsive to said last-mentioned operation of said wiper set for connecting said hold potential to the hold wiper of said wiper set and for connecting said first relay to the line wipers of said wiper set and for connecting said second relay to the control wiper of said wiper set and for completing a connection between the line conductors of said incoming trunk and said line wipers, means responsive to a supervisory control on the line conductors of said outgoing trunk for operating said first relay, means responsive to operation of said first relay for operating said second relay, additional means responsive to a supervisory control on the control conductor of said outgoing trunk for operating said second relay, and means responsive to operation of said second relay for returning a supervisory control over the control conductor of said incoming trunk.

7. In a telephone system, an automatic switch comprising an incoming trunk including a pair of line conductors and a control conductor and a hold conductor, a line relay provided with first and second windings that are respectively of low resistance and high resistance with respect to each other, a source of first potential, a first connection from said source of first potential via said first winding to said control conductor, a second connection from said source of first potential via said second and first windings in series to said control conductor, a supervisory relay having a restored position completing said first connection and interrupting said second connection and having an operated position completing said second connection and interrupting said first connection, a source of second potential adapted to be selectively connected to said control conductor in order selectively to energize said first winding or said first and second windings depending upon the completion of said first or second connections respectively, said line relay being operated when either said first winding is energized or said first and second windings are energized, a source of hold potential, means responsive to initial operation of said line relay in response to initial connection of said source of second potential to said control conductor for connecting said source of hold potential to said hold conductor, a wiper set, a line accessible to said wiper set, means responsive to operation and restoration of said line relay in response to one or more impuless of said source of second potential connected to said control conductor for operating said wiper set to select said line, means responsive to selection of said line by said wiper set for completing a connection between said line conductors and said wiper set, and means responsive to an answer control on said line for operating said supervisory relay and responsive to a disconnect control on said line for restoring said supervisory relay.

8. In a telephone system, an automatic switch comprising an incoming trunk including a pair of line conductors and a control conductor and a hold conductor, a line relay provided with first and second windings that are respectively of low resistance and high resistance with respect to each other, a source of first potential, a first connection from said source of first potential via said first winding to said control conductor, a second connection from said source of first potential via said second and first windings in series to said control conductor, a supervisory relay having a first position completing said first connection and interrupting said second connection and having a second position completing said second connection and interrupting said first connection, a source of second potential adapted to be selectively connected to said control conductor in order selectively to energize said first winding or said first and second windings depending upon the completion of said first or second connections respectively, said line relay being operated when either said first winding is energized or said first and second windings are energized, a source of hold potential, means responsive to initial operation of said line relay in response to initial connection of said source of second potential to said control conductor for connecting said source of hold potential to said hold conductor, a wiper set, a line accessible to said wiper set, means responsive to operation and restoration of said line relay in response to one or more impulses of said source of second potential connected to said control conductor for operating said wiper set to select said line, means responsive to selection of said line by said wiper set for completing a connection between said line conductors and said wiper set, and means responsive to supervisory controls on said line for selectively operating said supervisory relay between its first and second positions.

9. In a telephone system, an automatic switch comprising an incoming trunk including a pair of line conductors and a control conductor and a hold conductor, a line relay provided with first and second windings that are respectively of low resistance and high resistance with respect to each other, a source of first potential, a first connection from said source of first potential via said first winding to said control conductor, a second connection from said source of first potential via said second and first windings in series to said control conductor, a supervisory relay having a first position completing said first connection and interrupting said second connection and having a second position completing said second connection and interrupting said first connection, a source of second potential adapted to be selectively connected to said control conductor in order selectively to energize said first winding or said first and second windings depending upon the completion of said first or second connections respectively, said line relay being operated when either said first winding is energized or said first and second windings are energized, a source of hold potential, means responsive to initial operation of said line relay in response to initial connection of said source of second potential to said control conductor for connecting said source of hold potential to said hold conductor, a wiper set including a pair of line wipers and a control wiper and a hold wiper, an outgoing trunk including a pair of line conductors and a control conductor and a hold conductor, means responsive to operation and restoration of said line relay in response to one or more impulses of said source of second potential connected to said control conductor for operating said wiper set to select said outgoing trunk, and means responsive to selection of said outgoing trunk for connecting said hold potential to the hold wiper of said wiper set and for completing a connection between the line conductors of said incoming trunk and said line wipers and for connecting said supervisory relay to said control wiper, said supervisory relay being selectively operative between its first and second positions in response to supervisory signals on the control conductor of said outgoing trunk.

10. In a telephone system, an automatic switch comprising an incoming trunk including a pair of line conductors and a control conductor and a hold conductor, a line relay provided with first and second windings that are respectively of low resistance and high resistance with respect to each other, a source of first potential, a first connection from said source of first potential via said first winding to said control conductor, a second connection from said source of first potential via said second and first windings in series to said control conductor, a supervisory relay having a restored position completing said first connection and interrupting said second connection and having an operated position completing said second connection and interrupting said first connection, a source of second potential adapted to be selectively connected to said control conductor in order selectively to energize said first winding or said first and second windings depending upon the completion of said first or second connections respectively, said line relay being operated when either said first winding is energized or said first and second windings are energized, a source of hold potential, means responsive to initial operation of said line relay in response to initial connection of said source of second potential to said control conductor for connecting said source of hold potential to said hold conductor, a wiper set, a group of lines accessible to said wiper set, means responsive to operation and restoration of said line relay in response to one or more impulses of said source of second potential connected to said control conductor for operating said wiper set to select said group of lines, means for initiating operation of said wiper set to select an idle one of the lines in said group, means responsive to selection by said wiper set of an idle line in said group for arresting said last-mentioned operation thereof and for completing a connection between said line conductors and said wiper set, means responsive to an answer control on a line in said groups selected by said wiper set for operating said supervisory relay, and means including a busy device operated in response to a busy condition of all of the lines in said group for alternately completing and interrupting said first and second connections.

11. In a telephone system, an automatic switch comprising an incoming trunk including a pair of line conductors and a control conductor and a hold conductor, a line relay provided with first and second windings that are respectively of low resistance and high resistance with respect to each other, a source of first potential, a first connection from said source of first potential via said first winding to said control conductor, a second connection from said source of first potential via said second and first windings in series to said control conductor, a supervisory relay having a first position completing said first connection and interrupting said second connection and having a second position completing said second connection and interrupting said first connection, a source of second potential adapted to be selectively connected to said control conductor in order selectively to energize said first winding or said first and second windings depending upon the completion of said first or second connections respectively, said line relay being operated when either said first winding is energized or said first and second windings are energized, a source of hold potential, means responsive to initial operation of said line relay in response to initial connection of said source of second potential to said control conductor for connecting said source of hold potential to said hold conductor, a wiper set, a line accessible to said wiper set, means responsive to operation and restoration of said line relay in response to one or more impulses of said source of second potential connected to said control conductor for operating said wiper set to select said line, means responsive to selection of said line by said wiper set for completing a connection between said line conductors and said wiper set, means responsive to supervisory controls on said line for selectively operating said supervisory relay between its first and second positions, and means including a busy device operated in response to a busy operation of said wiper set for intermittently completing and interrupting said first and second connections.

12. In a telephone system, an automatic switch comprising an incoming trunk including a pair of line conductors and a control conductor and a hold conductor, a line relay provided with first and second windings that are respectively of low resistance and high resistance with respect to each other, a source of first potential, a first connection from said source of first potential via said first winding to said control conductor, a second connection from said source of first potential via said second and first windings in series to said control conductor, a supervisory relay having a first position completing said first connection and interrupting said second connection and having a second position completing said second connection and interrupting said first connection, a source of second potential adapted to be selectively connected to said control conductor in order selectively to energize said first winding or said first and second windings depending upon the completion of said first or second connections respectively, said line relay being operated when either said first winding is energized or said first and second windings are energized, a source of hold potential, means responsive to initial operation of said line relay in response to initial connection of said source of second potential to said control conductor for connecting said source of hold potential to said hold conductor, a wiper set, a line accessible to said wiper set, means responsive to operation and restoration of said line relay in response to one or more impulses of said source of second potential connected to said control conductor for operating said wiper set to select said line, means responsive to selection of said line by said wiper set for completing a connection between said line conductors and said wiper set, means responsive to supervisory controls on said line for selectively operating said supervisory relay between its first and second positions, busy contacts operated in response to a busy operation of said wiper set, and a busy conductor having said source of first potential intermittently connected thereto, operation of said busy contacts connecting said busy conductor via said first winding to said control conductor.

13. In a telephone system, an automatic switch comprising an incoming trunk including a pair of line conductors and a control conductor and a hold conductor, a wiper set including a pair of line wipers and a hold wiper, an outgoing trunk including a pair of line conductors and a hold conductor, a line relay, means controllable over the control conductor of said incoming trunk for selectively operating said line relay, a source of hold potential, means responsive to initial operation of said line relay for connecting said source of hold potential to the hold conductor of said incoming trunk, means responsive to subsequent restoration and reoperation of said line relay for operating said wiper set to select said outgoing trunk, an answer relay, means responsive to said last-mentioned operation of said wiper set for connecting said hold potential to the hold wiper of said wiper set and for connecting said answer relay to the line wipers of said wiper set and for completing a connection between the line conductors of said incoming trunk and said line wipers, means responsive to further restoration and reoperation of said line relay for repeating corresponding impulses over the line wipers of said wiper set and consequently over the line conductors of said outgoing trunk, means responsive to an answer control on the line conductors of said outgoing trunk for operating said answer relay, and means responsive to operation of said answer relay for returning an answer signal over the control conductor of said incoming trunk.

14. In a telephone system, an automatic switch comprising an incoming trunk including a pair of line conductors and a control conductor and a hold conductor, a wiper set including a pair of line wipers and a control wiper and a hold wiper, an outgoing trunk including a pair of line conductors and a control conductor and a hold conductor, a line relay, means controllable over the control conductor of said incoming trunk for selectively operating said line relay, a source of hold potential, means responsive to initial operation of said line relay for connecting said source of hold potential to the hold conductor of said incoming trunk, means responsive to subsequent restoration and reoperation of said line relay for operating said wiper set to select said outgoing trunk, a first relay, a second relay, means responsive to said last-mentioned operation of said wiper set for connecting said hold potential to the hold wiper of said wiper set and for connecting said first relay to the line wipers of said wiper set and for connecting said second relay to the control wiper of said wiper set and for completing a connection between the line conductors of said incoming trunk and said line wipers, means responsive to further restoration and reoperation of said line relay for repeating corresponding impulses over the line wipers of said wiper set and consequently over the line conductors of said outgoing trunk, means responsive to a supervisory control on the line conductors of said outgoing trunk for operating said first relay, means responsive to operation of said first relay for operating said second relay, additional means responsive to a supervisory control on the control conductor of said outgoing trunk for operating said second relay, and means responsive to operation of said second relay for returning a supervisory control over the control conductor of said incoming trunk.

15. In a telephone system, an automatic switch comprising an incoming trunk including a pair of line conductors and a control conductor and a hold conductor, a wiper set including a pair of line wipers and a control and a hold wiper, a first outgoing trunk including a pair of line conductors and a control conductor and a hold conductor, a second outgoing trunk including a pair of line conductors and a control conductor and a hold conductor, a line relay normally connected to the control conductor of said incoming trunk, said line relay being selectively operable over the control conductor of said incoming trunk when it is connected thereto, a source of hold potential, means responsive to initial operation of said line relay for connecting said source of hold potential to the hold conductor of said incoming trunk, means responsive to subsequent restoration and reoperation of said line relay for selectively operating said wiper set to select either said first outgoing trunk or said second outgoing trunk, a voice signal repeating unit including coupled primary and secondary windings, a first relay, a second relay, means responsive to operation of said wiper set to select said first outgoing trunk for connecting said hold potential to the hold wiper of said wiper set and for connecting the line conductors of said incoming trunk to said primary winding and for connecting said secondary winding and said first relay in series to the line wipers of said wiper set and for connecting said second relay to the control wiper of said wiper set, means responsive to a supervisory control on the line conductors of said first outgoing trunk for operating said first relay, means responsive to operation of said first relay for operating said second relay, additional means responsive to a supervisory control on the control conductor of said first outgoing trunk for operating said second relay, means responsive to operation of said second relay for returning a supervisory control over the control conductor of said incoming trunk, and means responsive to operation of said wiper set to select said second outgoing trunk for connecting said hold potential to the hold wiper of said wiper set and for disconnecting said line relay from the control conductor of said incoming trunk and for connecting the line conductors and the control conductor of said incoming trunk to the respective line wipers and control wiper of said wiper set.

PIER BAKKER.

References Cited in the file of this patent

UNITED STATES PATENTS

| Number | Name | Date |
|---|---|---|
| 1,474,008 | Stokely | Nov. 13, 1923 |
| 1,546,113 | Albert | July 14, 1925 |
| 1,577,083 | Sperry | Mar. 16, 1926 |
| 1,914,357 | Brooks | June 20, 1933 |
| 2,052,051 | Lomax | Aug. 25, 1936 |
| 2,504,708 | Long | Apr. 18, 1950 |